United States Patent
Petrossians et al.

(10) Patent No.: US 9,737,968 B2
(45) Date of Patent: Aug. 22, 2017

(54) MACHINE TOOL WITH VIBRATION DETECTION

(71) Applicant: Haas Automation, Inc., Oxnard, CA (US)

(72) Inventors: Razmik G. Petrossians, Glendale, CA (US); Joseph V. Soliman, Thousand Oaks, CA (US); Puneet Gupta, Simi Valley, CA (US); German M. Chistokhodov, Newbury Park, CA (US); Barry D. Johnson, Santa Rosa Valley, CA (US)

(73) Assignee: Haas Automation, Inc., Oxnard, CA (US)

( * ) Notice: Subject to any disclaimer, the term of this patent is extended or adjusted under 35 U.S.C. 154(b) by 577 days.

(21) Appl. No.: 14/214,041

(22) Filed: Mar. 14, 2014

(65) Prior Publication Data

US 2014/0262392 A1   Sep. 18, 2014

Related U.S. Application Data (60) Provisional application No. 61/799,740, filed on Mar. 15, 2013.

(51) Int. Cl.
| | |
|---|---|
| G08B 21/00 | (2006.01) |
| B23Q 17/12 | (2006.01) |
| G01M 1/22 | (2006.01) |
| G01M 1/36 | (2006.01) |

(52) U.S. Cl.
CPC ............... B23Q 17/12 (2013.01); G01M 1/22 (2013.01); G01M 1/36 (2013.01)

(58) Field of Classification Search
CPC .......... B23Q 17/12; G01M 1/22; G01M 1/36; G01M 13/028; G01M 13/045; G01H 1/003
See application file for complete search history.

(56) References Cited

U.S. PATENT DOCUMENTS

| | | | |
|---|---|---|---|
| 4,724,524 A | 2/1988 | Thomas et al. | |
| 7,430,916 B2 | 10/2008 | Trionfetti et al. | |
| 7,458,269 B2 | 12/2008 | Loesl et al. | |
| 2004/0083009 A1* | 4/2004 | Curless | G01H 1/00 700/1 |
| 2009/0091465 A1* | 4/2009 | Buckingham | A61B 5/11 340/683 |

* cited by examiner

*Primary Examiner* — Omeed Alizada
(74) *Attorney, Agent, or Firm* — McDermott Will & Emery LLP (57) ABSTRACT

A method of detecting machine tool vibration is provided. The method includes receiving, from a sensor arranged in a machine tool, motion data measured along an axis. The method also includes comparing the motion data against a first threshold. The method also includes adjusting a counter if the motion data has a magnitude greater than the first threshold. The method also includes generating an alarm if the counter is greater than a second threshold.

17 Claims, 4 Drawing Sheets

MACHINE TOOL WITH VIBRATION DETECTION

This application claims the benefit of U.S. Provisional Application No. 61/799,740, entitled "MACHINE TOOL WITH VIBRATION DETECTION" and filed on Mar. 15, 2013, the contents of which are incorporated by reference herein.

BACKGROUND

The present disclosure relates to vibration detection, and more particularly to machine tools with vibration detection.

Machine tools, such as a mill or lathe, use a variety of cutting tools to shape and finish a workpiece into a desired form. A hardened cutting tool may be mounted to a machine tool spindle that is rotated and fed into the workpiece to remove material from the workpiece using the cutting tool. Alternatively, the workpiece may be mounted to the spindle that is rotated and the workpiece shaped using a cutting tool. Basic machining operations include turning, facing, milling, drilling, boring, broaching, threading, and tapping. In addition, other operations may include sawing, grinding, gear cutting, polishing, buffing, and honing.

In order to maximize the utilization of the machine tool, the spindle and mounted cutting tool are often rotated at high speeds to remove material from the workpiece at the quickest rate possible. Similarly, the spindle and mounted workpiece can be rotated at high speeds. As the rotational speed of the spindle is increased, vibrations may develop, resulting in poor surface finish on the workpiece, reduced tool life, objectionable noise, damage to the machine tool and safety hazards to operators.

SUMMARY

According to some implementations, a method of detecting machine tool vibration is provided. The method includes receiving, from a sensor arranged in a machine tool, motion data measured along an axis. The method also includes comparing the motion data against a first threshold. The method also includes adjusting a counter if the motion data has a magnitude greater than the first threshold. The method also includes generating an alarm if the counter is greater than a second threshold.

According to some implementations, a non-transitory computer-readable medium having processor-executable instructions for a method of detecting machine tool vibration that cause a processor to perform certain operations is provided. The operations include receiving, from a sensor, motion data measured along multiple axes. The operations also include comparing the motion data of at least one of the plurality of axes against a first threshold. The operations also include adjusting respective counters associated with the plurality of axes if corresponding motion data has a magnitude greater than the first threshold. The operations also include generating an alarm if the counter is greater than a second threshold.

According to some implementations, a machine tool controller for detecting machine tool vibration is provided. The machine tool controller includes a sensor configured to measure physical movement of the machine tool controller along multiple axes. The machine tool controller also includes a processor coupled to the sensor, in which the processor is configured to receive, from the sensor, motion data measured along multiple axes. The processor is also configured to compare the motion data of at least one of the axes against a first threshold. The processor is also configured to adjust respective counters associated with one of the axes if corresponding motion data has a magnitude greater than the first threshold. The processor is also configured to generate an alarm if the counter is greater than a second threshold.

According to some implementations, a machine tool with vibration detection is provided. The machine tool includes a motor and a controller coupled to the motor, and the controller is configured to control the motor. The machine tool also includes a spindle coupled to the motor and configured to rotate on an axis. The machine tool also includes a sensor coupled to the controller and configured to sense physical movement in the machine tool. The machine tool also includes a processor coupled to the sensor and configured to receive motion data from the sensor to calculate a vibration magnitude. The processor may be configured to count a number of events of when the vibration magnitude is greater than a first threshold, and the processor is further configured to output an alarm if the number of events exceeds a second threshold.

Additional features and advantages of the subject technology will be set forth in the description below, and in part will be apparent from the description, or may be learned by practice of the subject technology. The advantages of the subject technology will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the subject technology and are incorporated in and constitute a part of this specification, illustrate aspects of the subject technology and together with the description serve to explain the principles of the subject technology.

DETAILED DESCRIPTION

In the following detailed description, numerous specific details are set forth to provide a full understanding of the subject technology. It will be apparent, however, that the subject technology may be practiced without some of these specific details. In other instances, structures and techniques have not been shown in detail so as not to obscure the subject technology.

Tool vibration may develop as the rotational speed of a spindle in a machine tool is increased. Vibration can be related to an imbalanced tool on a mill or an imbalanced workpiece on a lathe, for example. If the vibration is not reduced or eliminated during operation of the machine tool, the vibration can cause poor surface finish on the workpiece, objectionable noise, and reduced tool life. The vibration can also pose dangers to operators. For example, an unsupported bar stock on a lathe or a long drill bit can bend at high speeds causing excessive vibration, which creates unsafe conditions for operators. The subject technology provides a mechanism for sensing unwanted and unsafe vibration during machine tool operation to increase the safety of the machine tool operator with minimal cost, size and weight penalty to the design of the machine tool.

In this regard, the subject technology relates to a method of detecting machine tool vibration, in which the method includes receiving, from a sensor arranged in the machine tool, motion data measured along multiple axes. The method also includes comparing the motion data of at least one of the multiple axes against a first threshold. The method also includes adjusting a counter associated with one of the multiple axes if corresponding motion data has a magnitude greater than the first threshold. The method also includes generating an alarm if the counter is greater than a second threshold.

Figure 1:
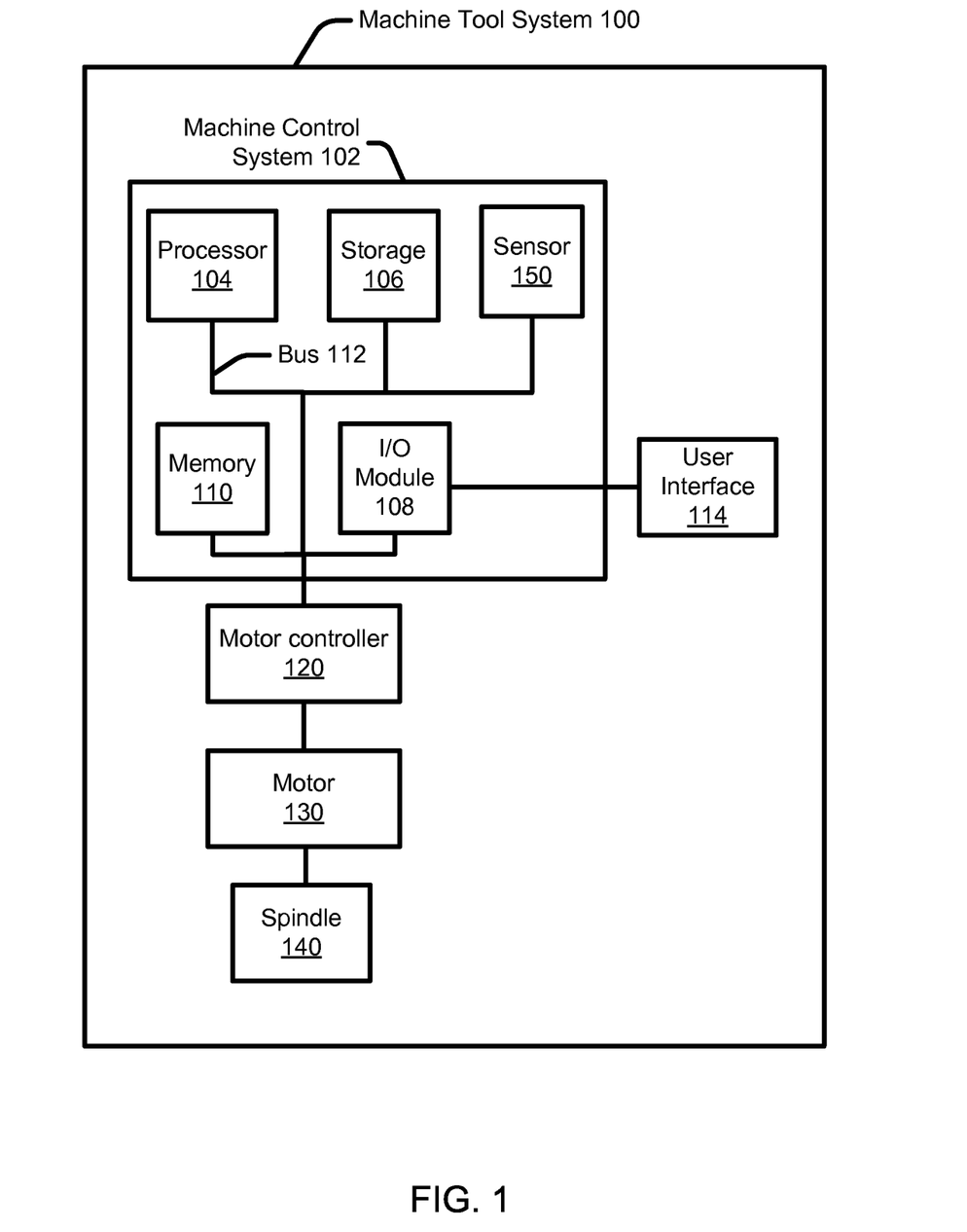
FIG. 1 is a block diagram illustrating components of a machine tool system, in accordance with various aspects of the subject disclosure.

FIG. 1 is a block diagram illustrating components of machine tool system 100, in accordance with various aspects of the subject disclosure. Machine tool system 100 includes machine control system 102, user interface 114, motor controller 120, motor 130, and spindle 140. In some aspects, machine tool system 100 is a computer-numerical-control (CNC) machine tool.

Machine control system 102 may receive machining programs, execute programmed commands of the machining programs to perform machining operations, monitor the status of the execution of the programmed commands, and/or provide feedback data. For example, machine control system 102 receives a machining program, which includes one or more commands to operate motor 130 via motor controller 120 to shape a workpiece.

Motor 130 uses electrical energy in order to produce mechanical energy to rotate spindle 140 during operation of machine tool system 100. Machine control system 102 may provide one command at a time to motor controller 120, which in turn executes the command to operate motor 130. Motor 130, for example, can rotate a cutting tool mounted to spindle 140 for operating on a workpiece or rotate a workpiece mounted to spindle 140. Motor controller 120 may receive and/or generate feedback data associated with motor 130 (e.g., position of motor 130, speed of motor 130, acceleration of motor 130, or rotation of motor 130), while machine control system 102 may generate program status data associated with the machining program (e.g., a current command being executed by motor controller 120, a previous command executed by motor controller 120, or a next command to be executed by motor controller 120). Although motor controller 120 is shown in FIG. 1 as separate from machine control system 102, motor controller 120 may also be part of machine control system 102 according to certain aspects of the subject technology.

Machine control system 102 includes processor module 104, storage module 106, input/output (I/O) module 108, memory module 110, bus 112 and sensor 150. Bus 112 may be any suitable communication mechanism for communicating data, commands and other information. Bus 112 collectively represents all system, peripheral, and chipset buses that communicatively connect the internal devices of machine control system 102. Processor module 104, storage module 106, I/O module 108, memory module 110 and sensor 150 are communicatively coupled with bus 112 for communicating information between any of the modules of machine control system 102 and/or information between any module of machine control system 102 and a device external to machine control system 102. For example, information communicated between any of the modules of machine control system 102 may include instructions, commands, data, addresses, etc. Bus 112 is not limited to any particular type of bus or combination of buses. For example, bus 112 may include EISA, PCI, VESA, ATA, USB, SCSI, IDE, etc. bus or buses. In some aspects, bus 112 also may provide network connectivity, such as an Ethernet interface. In this manner, machine tool system 100 can be a part of a network of computers (such as a local area network ("LAN"), a wide area network ("WAN"), or an Intranet, or a network of networks, such as the Internet.

In one or more implementations, machine control system 102 controls how much electrical energy is supplied to motor 130 via motor controller 120 so that the electrical energy can be converted into mechanical energy for driving spindle 140 to remove material from a workpiece, for example. Machine control system 102 and/or motor controller 120 may control an amount of current, a voltage level, or a combination of current and voltage supplied to motor 130 to drive spindle 140. The current and/or voltage may be regulated to vary material removal rate, rotational speed, and/or force available to drive spindle 140.

Motor 130 is not limited to any particular type of motor and, in some aspects, may be implemented using a servo motor. Motor 130 is coupled to spindle 140, which may be coupled to a turret (not shown) that receives a tool (e.g., a drill bit). When driven by motor 130, spindle 140 rotates on an axis. Depending on the machine tool, spindle 140 may be oriented in multiple different positions while processing a workpiece causing the orientation of the rotational axis to vary during processing. Machine tool system 100 can be a lathe that rotates the workpiece on an axis to perform various operations such as cutting, sanding, knurling, drilling, or deformation, facing, turning, with tools that are applied to the workpiece to create an object which has symmetry about the axis of rotation. In some aspects, machine tool system 100 may use multiple motors and/or actuators for positioning/rotating tools and/or workpieces to process the workpieces.

Processor module 104 may include one or more processors, where each processor may execute instructions and/or processes to cause machine tool system 100 to perform different functions. For example, one or more processors may execute instructions for performing operations (e.g., receiving the machining programs, providing the programmed commands of the machining programs to motor controller 120, monitoring the status of the execution of the programmed commands, generating program status data, etc.), and one or more processors may execute instructions for input/output functions. Processor module 104 also may include multiple processors configured to distribute and share processing loads to execute instructions and/or processes during the operation of machine tool system 100.

Sensor 150 is configured to sense physical movement in machine tool system 100. For example, sensor 150 may be an accelerometer configured to sense motion of the machine tool system 10 along one or more axes. As motor 130 rotates spindle 140 at high speeds, an imbalanced workpiece or cutting tool on spindle 140 can vibrate excessively, thus posing a safety hazard to an operator of machine tool system 100. In this regard, sensor 150 is configured to sense motion in one or more axes to detect unsafe vibration based on predefined parameters. If an unsafe vibration is sensed in the one or more axes, machine control system 102 can generate an alarm to motor controller 120 in order to stop or power off machine tool system 100.

As shown in FIG. 1, sensor 150 is arranged in machine control system 102 and is communicatively connected to processor module 104 via bus 112. For example, sensor 150 may be implemented as an integrated circuit mounted on a circuit board shared with one or more of the other components of machine control system 102. If machine tool system 100 vibrates during operation, sensor 150 can detect the physical movement. Implementing sensor 150 using an accelerometer arranged in machine control system 102 is a cost-effective approach for detecting physical movement in machine tool system 100 with minimal reconfiguration to machine tool system 100.

Alternatively, sensor 150 may be mounted outside of machine control system 102 and proximate to motor 130 and spindle 140 (e.g., spindle head) with wired or wireless connectivity to machine control system 102. Sensor 150 may be implemented with a short-range transmitter (e.g., Bluetooth or Near Field Communications) and bus 112 may be coupled to a transceiver (e.g., transmitter/receiver) to communicate with the short-range transmitter. Alternatively, sensor 150 may be wired directly to machine control system 102 while mounted on a chassis of machine tool system 100.

As noted above, sensor 150 may be an accelerometer. Sensor 150 may include a sensing element and a control interface that takes information from the sensing element and outputs motion data for each measured axis. For example, an electrical property of the sensing element may vary with motion of the accelerometer. By reading or detecting the state/value of the electrical property, motion of the accelerometer can be detected and measured. Sensor 150 is not limited to any particular type of accelerometer. For example, capacitive, piezoresistive, magnetoresistive, and/or microelectromechanical system (MEMS) motion sensors may be used.

Sensor 150 may be configured to measure physical movement in one axis. Alternatively, sensor 150, or multiple sensors 150, may be configured to measure physical movement in multiple axes. For example, sensor 150 can detect acceleration in three axes (e.g., x, y, z). As such, accelerometer may output individual data signals for each axis, or output a data bus having the output data signals aggregated. If sensor 150 outputs the data signals as an aggregated data bus, processor module 104 can process the incoming data signals as a whole or parse the data bus by respective axes.

Sensor 150 may convert analog data based on the sensed physical movement into digital data for storage. In this regard, sensor 150 may store the motion data in local memory during operation, and the local memory may be accessed by a control interface for output to processor module 104. The control interface may include clock signals and other control signals that access the motion data stored in the local memory. As such, the motion data may be output from sensor 150 at certain clock transitions using a specified address space. Processor module 104 also may be configured to read out motion data from sensor 150 at a specified rate and store the motion data for further processing according to the processes described herein.

Sensor 150 may be configured and/or calibrated to detect a select range of force (e.g., ½ g to 8 g). In some aspects, sensor 150 may be programmed to output an alarm when motion data has reached a programmable threshold in one or more axes. As such, sensor 150 may be programmed with one or more thresholds, such that each axis may have a different threshold. Alternatively, processor module 104 executing instructions may be configured to compare motion data read out of sensor 150 with one or more thresholds and output the alarm when the motion data has reached or exceeded one or more of the thresholds. In some aspects, each axis has the same programmable threshold. The range of force and threshold associated with the different axes of movement may be selected/programmed based on anticipated directions of movement within machine tool system 100 during operation on a workpiece, the weight of machine tool system 100, the size and weight of the workpiece, etc.

Memory module 110 stores data and instructions that are used/executed by processor module 104 and other modules of machine control system 102. Memory module 110 may be random-access memory (RAM) or other dynamic storage devices for storing information and instructions to be executed by processor module 104. Memory module 110 may also be used for storing temporary variables or other intermediate information during execution of instructions by processor module 104. In some aspects, memory module 110 may include battery-powered static RAM, which stores information without requiring power to maintain the stored information.

Storage module 106 is a non-volatile memory unit that stores instructions and data even when machine control system 102 is powered off. Processor module 104 may read instructions and data from storage module 106 into memory module 110 prior to executing the instructions or processing the data. Some implementations of the subject disclosure use a mass-storage device (such as a magnetic or optical disk and its corresponding disk drive) as storage module 106. Storage module 106 also may include hard disk storage or electronic memory storage (e.g., flash memory). In some aspects, memory module 110 and storage module 106 are both a machine-readable or computer-readable medium. Other implementations may use a removable storage device (such as a floppy disk, flash drive, and its corresponding disk drive) as storage module 106.

Memory module 110 may store instructions and data that processor module 104 needs at runtime. In some implementations, the processes of the subject disclosure are stored in memory module 110 and/or storage module 106. For example, memory module 110 and/or storage module 106 may store instructions for processing, generating, and/or providing access requests and/or access responses in accordance with some implementations. From memory module 110 and/or storage module 106, processor module 104 retrieves instructions to execute and data to process in order to execute the processes of the subject technology described herein.

I/O module 108 provides connectivity to machine control system 102 via input and output devices. Input devices may be used with I/O module 108 that include, for example, alphanumeric keyboards and pointing devices (also called "cursor control devices"). Output devices also may be used with I/O module 108 to enable, for example, the display of images generated by machine control system 102. Output devices include, for example, printers and display devices, such as liquid crystal displays (LCD). Some implementations include devices such as a touchscreen (or touch panel) that functions as both input and output devices.

I/O module 108 enables the user (or operator) to communicate information and select commands to machine control system 102 via user interface 114. User interface 114 may include a display screen, a sound system, a keyboard, a mouse, a touch screen, or any other suitable device to allow interaction between machine control system 102 and an operator of machine tool system 100. Machine control system 102 may communicate information, such as the rotational speed and/or deceleration rate of the motor, through I/O module 108, to an operator of machine tool system 100 via user interface 114.

According to various aspects of the subject technology, processor module 104 executes one or more sequences of instructions contained in memory module 110 and/or storage module 106. In one example, instructions may be read into memory module 110 from another machine-readable medium, such as storage module 106. In another example, instructions may be read directly into memory module 110 from I/O module 108, for example from the operator of machine tool system 100 via user interface 114.

Execution of the sequences of instructions contained in memory module 110 and/or storage module 106 causes processor module 104 to perform operations. For example, a computational algorithm for performing these operations may be stored in memory module 110 and/or storage module 106 as one or more sequences of instructions. Information such as machining programs, program status data, feedback data, termination signals, reset signals, start signals, hold signals, and/or other information for operating machine tool system 100 may be communicated from processor module 104 to memory module 110 and/or storage module 106 via bus 112 for storage. In some aspects, the information may be communicated from processor module 104, memory module 110, and/or storage module 106 to I/O module 108 via bus 112. The information may then be communicated from I/O module 108 to the operator of machine tool system 100 via user interface 114.

As noted above, one or more processors in a multi-processing arrangement may also be employed to execute the sequences of instructions contained in memory module 110 and/or storage module 106. In some aspects, hard-wired circuitry may be used in place of or in combination with software instructions to implement various aspects of the subject technology. Thus, aspects of the subject technology are not limited to any specific combination of hardware circuitry and software.

The term "machine-readable medium," or "computer-readable medium," as used herein, refers to any non-transitory medium that participates in providing instructions to processor module 104 for execution. Such a medium may take many forms, including, but not limited to, non-volatile media, and volatile media. Non-volatile media include, for example, optical or magnetic disks, such as storage module 106. Volatile media include dynamic memory, such as memory module 110. Common forms of machine-readable media or computer-readable media include, for example, floppy disk, a flexible disk, hard disk, magnetic tape, any other magnetic medium, a CD-ROM, DVD, any other optical medium, punch cards, paper tape, any other physical mediums with patterns of holes, a RAM, a PROM, an EPROM, a FLASH EPROM, any other memory chip or cartridge, or any other medium from which a processor can read.

Figure 2:
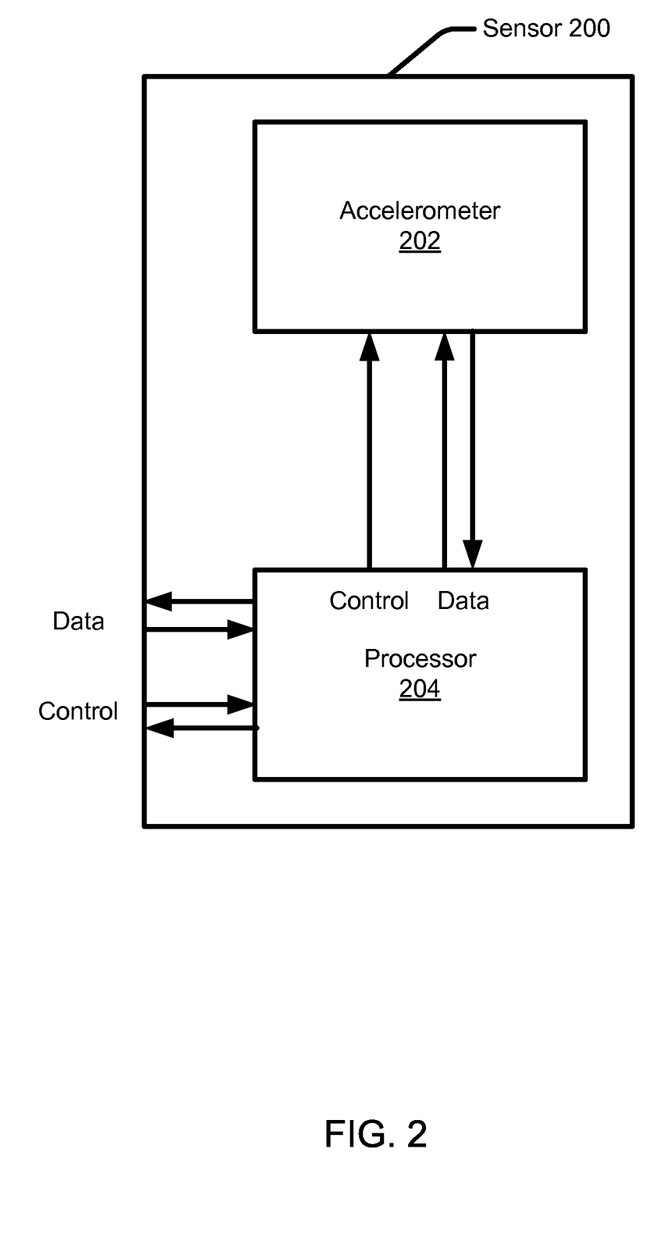
FIG. 2 is a block diagram illustrating components of a sensor mounted in the machine tool system of FIG. 1, in accordance with various aspects of the subject technology.

FIG. 2 is a block diagram illustrating components of sensor 200 in accordance with various aspects of the subject technology. As shown in FIG. 2, sensor 200 includes accelerometer 202 and processor 204. Sensor 200 represents configurations where the sensor is not mounted on a printed circuit board shared with one or more other components of machine control system 102. Sensor 200 may be mounted in machine control system 102 and coupled to the other components of machine control system 102 via an interface to bus 112. Sensor 200 also may be mounted outside of machine control system 201 proximate to motor 130 and spindle 140. Sensor 200 also may be mounted to other components of machine tool system 100 such as to the chassis. Communication between sensor 200 and machine control system 102 may be via wired or wireless techniques as noted above.

Accelerometer 202 may correspond to sensor 150 described above with respect to FIG. 1 and be implemented with the same component(s). Accelerometer 202 is coupled to processor 204, and accelerometer 202 may receive control signals from processor 204 and make motion sensing data available to processor 204. In some aspects, sensor 200 may include multiple accelerometers coupled to processor 204 configured to receive and process motion data from each of the accelerometers.

Processor 204 retrieves instructions to execute and data to process in order to execute processes of the subject disclosure. Processor 204 can be a single processor or a multi-core processor in different implementations. For example, processor 204 may execute instructions for processing the motion data obtained in accelerometer 202. Such processing may include reading the motion data, calculating magnitudes for one or more respective axes of the motion data, comparing the calculated magnitude against a first threshold, incrementing or decrementing a counter based on whether the magnitude exceeds the first threshold, determining whether the counter has reached a second threshold, and generating an alarm when the counter has exceeded the second threshold. Processor 204 may include control and data interfaces with other components of machine control system 102 to enable communication of signals such as an alarm when a counter has reached or exceeded a threshold. Processor 204 may include memory for storing instructions and/or data.

Figure 3:
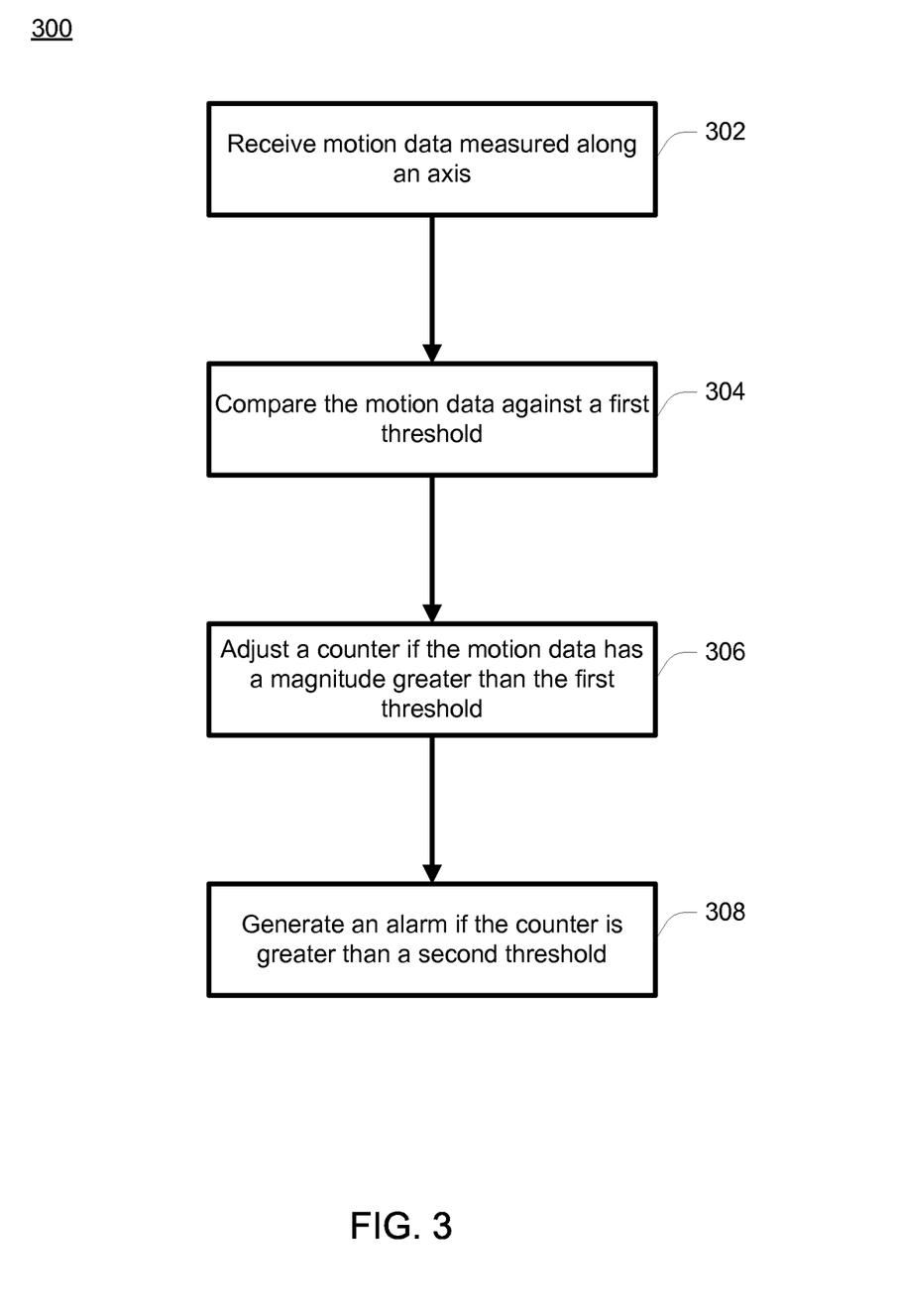
FIG. 3 illustrates a flowchart of a method of detecting vibration in the machine tool system of FIG. 1, in accordance with various aspects of the subject technology.

FIG. 3 illustrates a flowchart of a method 300 of detecting vibration in machine tool system 100 of FIG. 1, in accordance with various aspects of the subject technology. Method 300 includes receiving motion data measured along an axis (302). In some aspects, processor module 104 (FIG. 1) may execute instructions that read an address space in local memory of sensor 150 (FIG. 1) to receive motion data corresponding to the axis.

As noted above, the sensor may output a value corresponding to an electrical property (capacitance, voltage, resistance, etc.) to represent motion along an axis. The sensor and/or the processor may be configured to map the value of the electrical property to a value representing motion along the axis, such as acceleration. The sensor and/or the processor may be configured to output the electrical property value at a frequency set to monitor vibration of the machine tool system. The subject technology is not limited to any particular frequency or mapping, which may vary depending on the sensor type, machine tool system type, manufacturing process, etc.

In receiving the motion data, method 300 may include receiving motion data measured along multiple axes. In this regard, sensor 150 may be a three-axis motion sensor that detects physical movement in the x, y and z axes. The x, y and z axes may be orthogonal axes or non-orthogonal axes arranged according to expected movement of the machine tool system. Processor module 104 may receive individual data signals for each axis, or can receive the data signals aggregated in a multi-bit data bus. In this regard, processor module 104 may be programmed to select one or more data signals pertaining to an axis of interest.

In further receiving the motion data, method 300 may include selecting one of the multiple axes to determine a subset of the motion data that corresponds to the selected axis. In this regard, sensor 150 may combine the data from each axis to output a bus of data signals to processor module 104. The data may be marked or tagged to identify one or more portions of motion data pertaining to a particular axis.

In selecting the axis, method 300 may include selecting the subset of motion data that corresponds to the selected axis. Given that the motion data may include different sets of measured accelerations for any given axis, it may be desirable to parse the motion data according to the axis of interest. As such, only the selected subset of motion data may be processed for comparison.

In selecting the subset of motion data, method 300 may include calculating a magnitude of vibration along the selected axis based on the subset of motion data. Because sensor 150 is configured to measure accelerations along one or more axes, the magnitude of the movement is quantified to determine whether the movement has reached an unwanted or unsafe condition. In this regard, a first threshold may be programmed by processor module 104 that represents a magnitude of vibration considered to be at or near unsafe levels. In some aspects, method 300 includes setting the first threshold based on physical characteristics of machine tool system 100. For example, the first threshold can vary based on the size, weight and power of machine tool system 100. In one example, the first threshold can be set at 500 mg (or ½ g) when machine tool system 100 has an approximate weight of 7,000 pounds. In another example, the first threshold can be set at 1000 mg (or 1 g) when machine tool system 100 has an approximate weight of 11,000 pounds. As such, the sensitivity for triggering an alarm may decrease as machine tool system 100 increases in weight or size.

Method 300 also includes comparing the motion data against a first threshold (304). As stated above, a first threshold can be programmed to represent a magnitude or level of unsafe vibration in machine tool system 100. Processor module 104 may be programmed to execute an instruction that causes processor module 104 to perform a comparison between the motion data and the first threshold. In some aspects, the comparison determines whether the motion data is greater than the first threshold. The compared data is the magnitude of vibration in absolute form and a predefined or programmable threshold.

In one or more implementations, comparing the motion data includes comparing the motion data corresponding to one or more axes against the first threshold. As stated above, processor module 104 can receive motion data for multiple axes. As such, one or more subsets of the motion data associated with the axis selected for comparison is compared. In turn, the magnitude of vibration along the selected axis is the valued used to compare against the first threshold.

Method 300 also includes adjusting a counter if the motion data has a magnitude greater than the first threshold (306). The counter is helpful to determine how many peaks of vibration have been detected over a period of time before the amount of vibration is considered to be a problem or unsafe. In this regard, the counter will be incremented or decremented based on the comparison between the magnitude level of vibration and the first threshold. The frequency at which the motion data is sampled and compared against the threshold determines the period of time used to evaluate whether a vibration problem is occurring. The counter can store the number of times an event has been detected such as each time the magnitude level exceeds the first threshold.

In adjusting the counter, method 300 includes adjusting a different counter associated with one of the multiple axes. In turn, the respective counter is adjusted if motion data associated with the axis has a magnitude greater than the first threshold. Particularly, the counter associated with the axis can be incremented if the magnitude is greater than the first threshold. Alternatively, the counter can be decremented if the magnitude is less than the first threshold. In some aspects, the operation of the counter is the same whether there is a single axis or multiple axes used for measuring the physical movement in machine tool system 100.

In cases where multiple axes are used for measuring physical movement (or vibration), method 300 may include adjusting multiple counters based on respective subsets of the motion data. Each of the counters may be associated with one of the multiple axes, and each of the respective subsets of the motion data is also associated with one of the multiple axes. As such, a counter of a corresponding axis is incremented or decremented based on whether the respective subset of motion data exceeds the first threshold. In one example, the x-axis has a counter that is adjusted when motion data captured along the x-axis exceeds the first threshold. In another example, the y-axis has a counter that is adjusted when motion data captured along the y-axis exceeds the first threshold.

Method 300 also includes generating an alarm if the counter is greater than a second threshold (308). The alarm is useful to warn operators of an unsafe condition, but is also useful to trigger a shutdown of machine tool system 100 to prevent damage to the machine tool system and harm to the operator. The alarm is generated when processor module 104 determines that machine tool system 100 is experiencing a number of events deemed unsafe. For example, the counter is incremented to quantify the number of times a particular event has been detected before determining that the detected event is a problem. As such, the alarm can be generated as a notification to the operator or as an output instruction that causes operation of machine tool system 100 to cease. In some aspects, generating the alarm includes resetting the alarm if operation of the machine is ceased. In one or more implementations, the second threshold is a positive integer value representing a threshold number of events. The second threshold can be programmed on-the-fly (e.g., during operation) via user interface 114 (FIG. 1).

In some aspects, method 300 includes determining that a rotating component of machine tool system 100 is running if the counter is greater than the second threshold. For example, processor module 104 may be programmed to determine if spindle 140 (FIG. 1) is rotating. As such, the rotation of spindle 140 may be determined as a cause of the vibration reaching unsafe levels. An alarm can then be generated if the rotating component (e.g., spindle 140) is determined to be running. As stated above, the alarm can be generated independent of determining whether a rotating component is running.

In some aspects, method 300 includes calculating a root-mean-square (RMS) acceleration value based on the motion data before performing any comparisons. The calculated RMS acceleration value can be displayed for reference to the operator of machine tool system 100 during machining operations.

These functions described above can be implemented in digital electronic circuitry, in computer software, firmware or hardware. The techniques are implemented using one or more computer program products. The processes and logic flows are performed by one or more programmable processors and by one or more programmable logic circuitry. General and special purpose computing devices and storage devices are interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra density optical discs, any other optical or magnetic media, and floppy disks. The computer-readable media can store a computer program that is executable by at least one processing unit and includes sets of instructions for performing various operations. Examples of computer programs or computer code include machine code, such as are produced by a compiler, and files including higher-level code that are executed by a computer, an electronic component, or a microprocessor using an interpreter.

Figure 4:
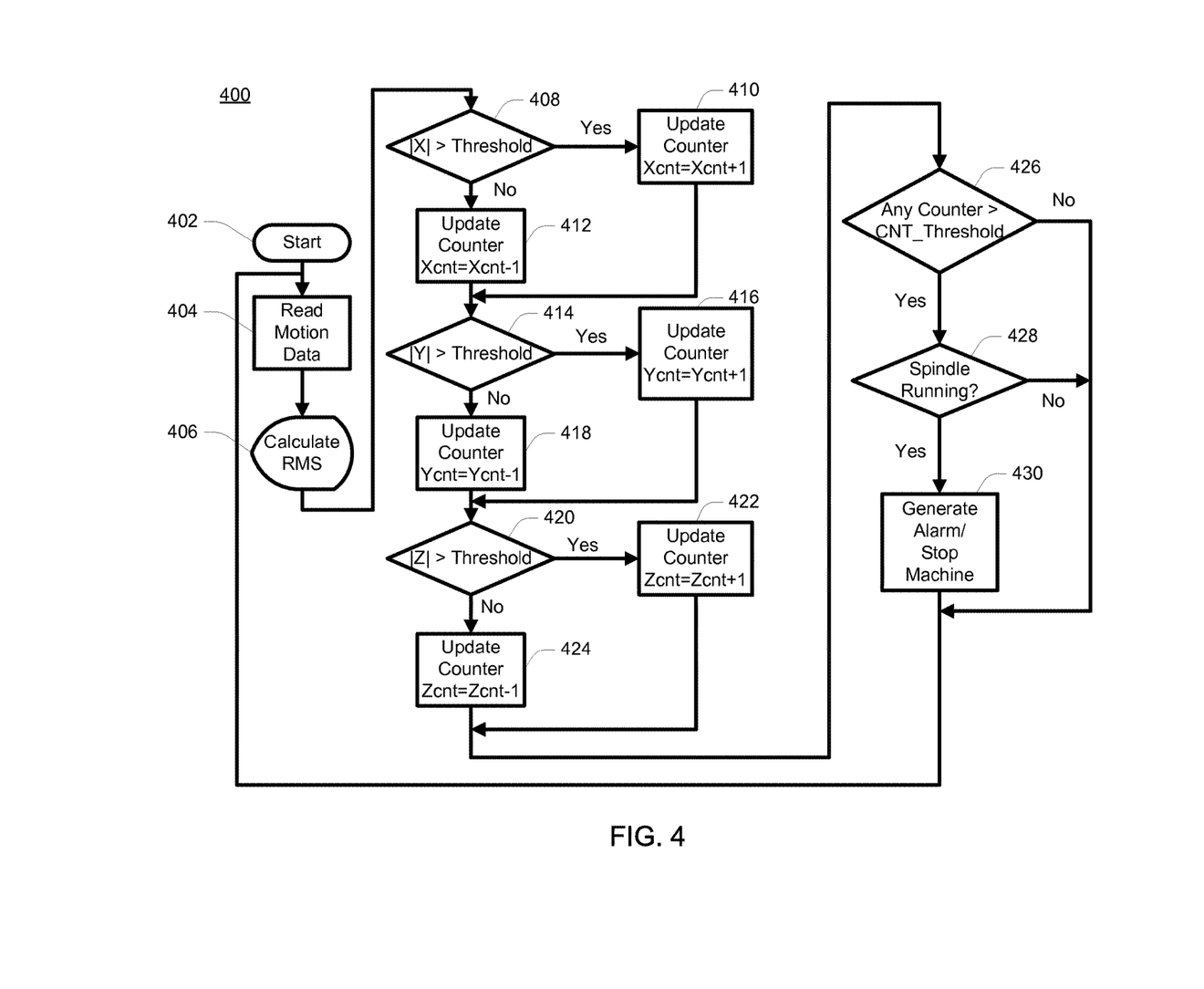
FIG. 4 illustrates a flowchart of detecting vibration in the machine tool system of FIG. 1 along multiple axes, in accordance with various aspects of the subject technology.

FIG. 4 illustrates a flowchart for detecting vibration in machine tool system 100 of FIG. 1 in multiple axes, in accordance with various aspects of the subject technology. At the start, parameters may be set including setting a magnitude threshold that represents a dangerous or excessive level of vibration (402). In this regard, processor module 104 may be programmed to set the magnitude threshold as a positive integer value. Processor module 104 then reads motion data obtained by sensor 150, containing measurements taken along multiple axes (404). An RMS value is calculated and displayed for reference to the operator of machine tool system 100 (406).

Upon reading the motion data, processor module 104 compares the magnitude value of motion data (e.g., acceleration magnitude) corresponding to the x-axis against the magnitude threshold discussed above (408). If the x-axis acceleration magnitude exceeds the magnitude threshold, then a counter associated with the x-axis is incremented by one (410). The counter represents a sampling window based on the sampling size, sampling rate and sampling period. For example, a sampling period of 2 seconds may include obtaining a sample from sensor 150 every 2 milliseconds for a total of 1000 samples. In some aspects, a comparison is performed after each sample. In some aspects, a comparison is performed after a number of samples are gathered. The sample rate can be part-dependent, such that, the sampling period will vary based on the type of accelerometer implemented. In this regard, certain accelerometers may have certain specifications, so different accelerometers provide different performance characteristics (e.g., sampling rate, sampling output). As such, the number of samples and the sampling period can be different from the aforementioned implementation.

Referring back to the comparison, if the x-axis acceleration magnitude does not exceed the magnitude threshold, then the counter is decremented by one (412). As such, the running window is reduced. The motion data can also include physical movement in the y-axis. As such, processor module 104 compares the y-axis acceleration magnitude with the magnitude threshold (414). If the y-axis acceleration magnitude exceeds the threshold, then the counter associated with the y-axis is incremented by one (416). On the other hand, if the y-axis acceleration magnitude does not exceed (is not greater than) the magnitude threshold, then the y-axis counter is decremented by one (418).

The motion data can also include physical movement in the z-axis. As such, processor module 104 compares the z-axis acceleration magnitude with the magnitude threshold (420). If the z-axis acceleration magnitude exceeds the threshold, then the counter associated with the z-axis is incremented by one (422). On the other hand, if the z-axis acceleration magnitude does not exceed (is not greater than) the magnitude threshold, then the z-axis counter is decremented by one (424).

Once all three axes are compared and the corresponding counter is adjusted, each counter is compared against a count threshold (426). Here, the count threshold may be a positive integer value that represents a threshold number of times the event is determined to be a problem (or unsafe) to the operator of machine tool system 100. Like the magnitude threshold, the count threshold may be programmed in advance (preset) or programmed on-the-fly (dynamically).

In some aspects, if any of the counters (e.g., x-axis counter, y-axis counter, z-axis counter) has a count value that exceeds the count threshold, then an alarm is generated and the machine can be instructed to cease all operation (430). In some aspects, if the count value exceeds the count threshold, processor module 104 may be instructed to determine if spindle 140 is running before generating the alarm (428). Once the alarm has been generated or the machine has ceased operation, the flowchart may resume operation at the start block, where machine tool system 100 is restarted and processor module 104 may be instructed to read new motion data to calculate new magnitude values for operation.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "processor", and "memory" all refer to electronic or other technological devices. These terms exclude people or groups of people. For the purposes of the specification, the terms "display" or "displaying" means displaying on an electronic device. As used in this specification and any claims of this application, the terms "computer readable medium" and "computer readable media" are entirely restricted to tangible, non-transitory, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, such as an LCD monitor, for displaying information to the user and a keyboard and a pointing device, such as a mouse or a trackball, by which the user can provide input to the computer. Other kinds of devices are used to provide for interaction with a user as well; for example, feedback provided to the user can be any form of sensory feedback, such as visual feedback, auditory feedback, or tactile feedback; and input from the user can be received in any form, including acoustic, speech, or tactile input.

It is understood that any specific order or hierarchy of blocks in the processes disclosed is an illustration of example approaches. Based upon design preferences, it is understood that the specific order or hierarchy of blocks in the processes are rearranged, or that all illustrated blocks be performed. Some of the blocks are performed simultaneously. For example, in certain circumstances, multitasking and parallel processing is advantageous. Moreover, the separation of various system components in the implementations described above should not be understood as requiring such separation in all implementations.

The previous description is provided to enable any person skilled in the art to practice the various aspects described herein. Various modifications to these aspects will be readily apparent to those skilled in the art, and the generic principles defined herein are applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Headings and subheadings, if any, are used for convenience only and do not limit the subject disclosure.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code A phrase such as an "aspect" does not imply that such aspect is essential to the subject disclosure or that such aspect applies to all configurations of the subject disclosure. A disclosure relating to an aspect may apply to all configurations, or one or more configurations. A phrase such as an aspect may refer to one or more aspects and vice versa. A phrase such as a "configuration" does not imply that such configuration is essential to the subject disclosure or that such configuration applies to all configurations of the subject disclosure. A disclosure relating to a configuration may apply to all configurations, or one or more configurations. A phrase such as a configuration may refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A method of detecting machine tool vibration, the method comprising:
receiving, from a sensor arranged in a machine tool, motion data measured along a plurality of axes;
comparing the motion data measured along the plurality of axes against respective first thresholds;
increasing respective counters associated with the plurality of axes if motion data associated with the respective plurality of axes has a magnitude that satisfies the respective first thresholds;
decreasing the respective counters associated with the plurality of axes if the motion data associated with the respective plurality of axes has a magnitude that does not satisfy the respective first thresholds;
comparing the respective counters against a second threshold; and
generating an alarm if one of the respective counters is greater than the second threshold.

2. The method of claim 1, further comprising selecting one of the plurality of axes to determine a subset of the motion data that corresponds to the selected axis.

3. The method of claim 2, further comprising selecting the subset of the motion data that corresponds to the selected axis.

4. The method of claim 3, further comprising calculating a magnitude of vibration along the selected axis based on the subset of the motion data.

5. The method of claim 4, wherein comparing the motion data comprises comparing the magnitude of vibration along the selected axis against the respective first threshold.

6. The method of claim 1, wherein increasing or decreasing the respective counters comprises increasing or decreasing the respective counters based on respective subsets of the motion data, wherein each of the respective subsets of the motion data is associated with a respective one of the plurality of axes.

7. The method of claim 1, further comprising outputting an instruction that causes the machine tool to cease operation if one of the respective counters is greater than the second threshold.

8. The method of claim 1, further comprising determining if a motor of the machine tool is running, wherein the alarm is generated if the motor of the machine tool is running, and wherein the alarm is not generated if the motor of the machine tool is not running.

9. The method of claim 1, further comprising:
calculating a root-mean-square acceleration value based on the motion data; and
providing the root-mean-square acceleration value for display.

10. The method of claim 1, further comprising:
setting the first thresholds based on an amount of expected vibration along the respective plurality of axes.

11. The method of claim 1, further comprising:
setting the first thresholds based on physical characteristics of the machine tool,
wherein the physical characteristics include size, weight or power of the machine tool.

12. A non-transitory computer-readable medium comprising processor-executable instructions for a method of detecting machine tool vibration that causes a processor to perform operations comprising:
receiving, from a sensor arranged in a machine tool, motion data measured along a plurality of axes;
comparing the motion data of at least one of the plurality of axes against respective first thresholds;
increasing respective counters associated with the respective plurality of axes if corresponding motion data has a magnitude that satisfies the respective first thresholds;

decreasing the respective counters associated with the respective plurality of axes if the corresponding motion data has a magnitude that does not satisfy the respective first thresholds;

comparing the respective counters against a second threshold; and generating an alarm if one of the respective counters is greater than the second threshold.

13. A machine tool controller for detecting vibration, the machine tool controller comprising:

a sensor configured to measure physical movement along a plurality of axes; and a processor coupled to the sensor, the processor configured to:

receive, from the sensor, motion data measured along a plurality of axes;

compare the motion data of at least one of the plurality of axes against respective first thresholds;

increase respective counters associated with the respective plurality of axes if corresponding motion data has a magnitude that satisfies the respective first thresholds;

decrease the respective counters associated with the respective plurality of axes if the corresponding motion data has a magnitude that does not satisfy the respective first thresholds;

compare the respective counters against a second threshold; and generate an alarm if any of the respective counters are greater than the second threshold.

14. The machine tool controller of claim 13, wherein the sensor is an accelerometer.

15. A machine tool, comprising:

a motor;

a controller coupled to the motor and configured to control the motor;

a spindle coupled to the motor and configured to rotate on an axis;

a sensor coupled to the controller and configured to sense physical movement in the machine tool along a plurality of axes; and a processor coupled to the sensor and configured to receive motion data from the sensor to calculate a vibration magnitude for each of the plurality of axes, wherein the processor is further configured to:

compare the vibration magnitudes for the plurality of axes against respective first thresholds;

increase a count of a number of events associated with one of the plurality of axes when the respective vibration magnitude satisfies the respective first threshold;

decrease the count of the number of events associated with the one of the plurality of axes when the respective vibration magnitude does not satisfy the respective first threshold;

compare the count of the number of events associated with the one of the plurality of axes against a second threshold; and generate an alarm if the count of the number of events exceeds the second threshold.

16. The machine tool of claim 15, wherein the sensor comprises an accelerometer for measuring machine tool vibration along the plurality of axes.

17. The machine tool of claim 15, wherein the controller receives an instruction to cease operation if the alarm is generated.

* * * * *